US012619238B2

(12) United States Patent (10) Patent No.: US 12,619,238 B2
Kita et al. (45) Date of Patent: May 5, 2026

(54) CONTROL METHOD, CONTROL DEVICE, AND NON-TRANSITORY COMPUTER READABLE STORAGE MEDIUM

(71) Applicant: Panasonic Intellectual Property Corporation of America, Torrance, CA (US)

(72) Inventors: Atsuyoshi Kita, Osaka (JP); Tetsuji Fuchikami, Osaka (JP); Tatsumi Nagashima, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 800 days.

(21) Appl. No.: 17/858,730

(22) Filed: Jul. 6, 2022

(65) Prior Publication Data

US 2022/0357748 A1 Nov. 10, 2022

Related U.S. Application Data

(63) Continuation of application No. PCT/JP2021/012334, filed on Mar. 24, 2021.

(30) Foreign Application Priority Data

Jun. 26, 2020 (JP) ................................. 2020-110362

(51) Int. Cl.
*G05D 1/00* (2024.01)
(52) U.S. Cl.
CPC ......... *G05D 1/0217* (2013.01); *G05D 1/0291* (2013.01)
(58) Field of Classification Search
None
See application file for complete search history.

(56) References Cited

U.S. PATENT DOCUMENTS 5,892,346 A * 4/1999 Moroto .............. G01C 21/3469
318/587
2010/0174436 A1* 7/2010 Matsunaga .......... G05D 1/0212
701/26

(Continued)

FOREIGN PATENT DOCUMENTS

JP 04-012604 1/1992
JP 2011-054048 3/2011

(Continued)

OTHER PUBLICATIONS

International Search Report (ISR) from International Searching Authority (Japan Patent Office) in International Pat. Appl. No. PCT/JP2021/012334, dated Jun. 8, 2021, together with an English language translation.

*Primary Examiner* — Truc M Do
(74) *Attorney, Agent, or Firm* — Greenblum & Bernstein, P.L.C.

(57) ABSTRACT

A control method of controlling a plurality of moving objects that convey a plurality of cargos includes, by a computer, acquiring a residual battery capacity of the plurality of moving objects, determining a target residual battery capacity of the plurality of moving objects in a next unit of time, allocating a conveyance unit to each of the moving objects based on a residual battery capacity and a target residual battery capacity of each of the moving objects and a weight of each of the cargos, and transmitting, to each of the moving objects, control information instructing a conveyance work of the conveyance unit allocated to each of the moving objects.

16 Claims, 4 Drawing Sheets

(56)     References Cited

U.S. PATENT DOCUMENTS

| | | | |
|---|---|---|---|
| 2013/0035823 A1 | 2/2013 | Yoshida | |
| 2014/0007135 A1* | 1/2014 | Yamauchi | G06F 9/4887 |
| | | | 718/107 |
| 2015/0377971 A1* | 12/2015 | Keating | H02J 7/0048 |
| | | | 307/130 |
| 2016/0236867 A1* | 8/2016 | Brazeau | B25J 5/007 |
| 2019/0006689 A1 | 1/2019 | Nada | |
| 2019/0049975 A1* | 2/2019 | Kattepur | G05B 19/41865 |
| 2020/0324970 A1* | 10/2020 | Raizer | G05D 1/0027 |
| 2022/0245574 A1* | 8/2022 | Cella | G06Q 10/087 |

FOREIGN PATENT DOCUMENTS

| | | |
|---|---|---|
| JP | 2013-033403 | 2/2013 |
| JP | 2017-189014 | 10/2017 |
| JP | 2018-513817 | 5/2018 |
| JP | 2019-013062 | 1/2019 |

* cited by examiner i-TH MOVING OBJECT     j-TH WORK CATEGORY i-TH MOVING OBJECT     j-TH CARGO (REQUIRED TIME tj)

CONTROL METHOD, CONTROL DEVICE, AND NON-TRANSITORY COMPUTER READABLE STORAGE MEDIUM

TECHNICAL FIELD

The present disclosure relates to a technique in which a plurality of chargeable moving objects convey a plurality of cargos.

BACKGROUND ART

In recent years, a technique in which a plurality of chargeable moving objects convey a plurality of cargos has become widespread. As such a technique, for example, Patent Literature 1 discloses an automated warehouse system in which a plurality of chargeable robots convey parcels in a warehouse. In this automated warehouse system, a part of the warehouse is provided as a parking space for the robots, and batteries of the robots are charged in the parking space.

However, in the automated warehouse system, when charging timings of the batteries of the plurality of robots overlap with each other, the plurality of robots cannot be accommodated in the parking space simultaneously, and there is a risk that a space near the parking space is compressed.

It is therefore conceivable to provide a parking space capable of simultaneously accommodating the plurality of robots in the warehouse, but in this case, there may be a problem that a space for arranging the cargos is reduced.

CITATION LIST

Patent Literature

Patent Literature 1: JP 2018-513817 A

SUMMARY OF INVENTION

The present disclosure has been made in view of the above problems, and an object of the present disclosure is to reduce opportunities for a charging device to simultaneously charge a plurality of chargeable moving objects conveying a plurality of cargos, the number of moving objects being more than or equal to the number of moving objects that are simultaneously chargeable.

In order to solve the above problems, a control method according to one aspect of the present disclosure is a control method of controlling a plurality of moving objects that convey a plurality of cargos, the method including, by a computer, acquiring a residual battery capacity of the plurality of moving objects, determining a target residual battery capacity of the plurality of moving objects in a next unit of time, allocating a conveyance unit to each of the moving objects based on a residual battery capacity and a target residual battery capacity of each of the moving objects and a weight of each of the cargos, and transmitting, to each of the moving objects, control information instructing a conveyance work of the conveyance unit allocated to each of the moving objects.

Figure 1:
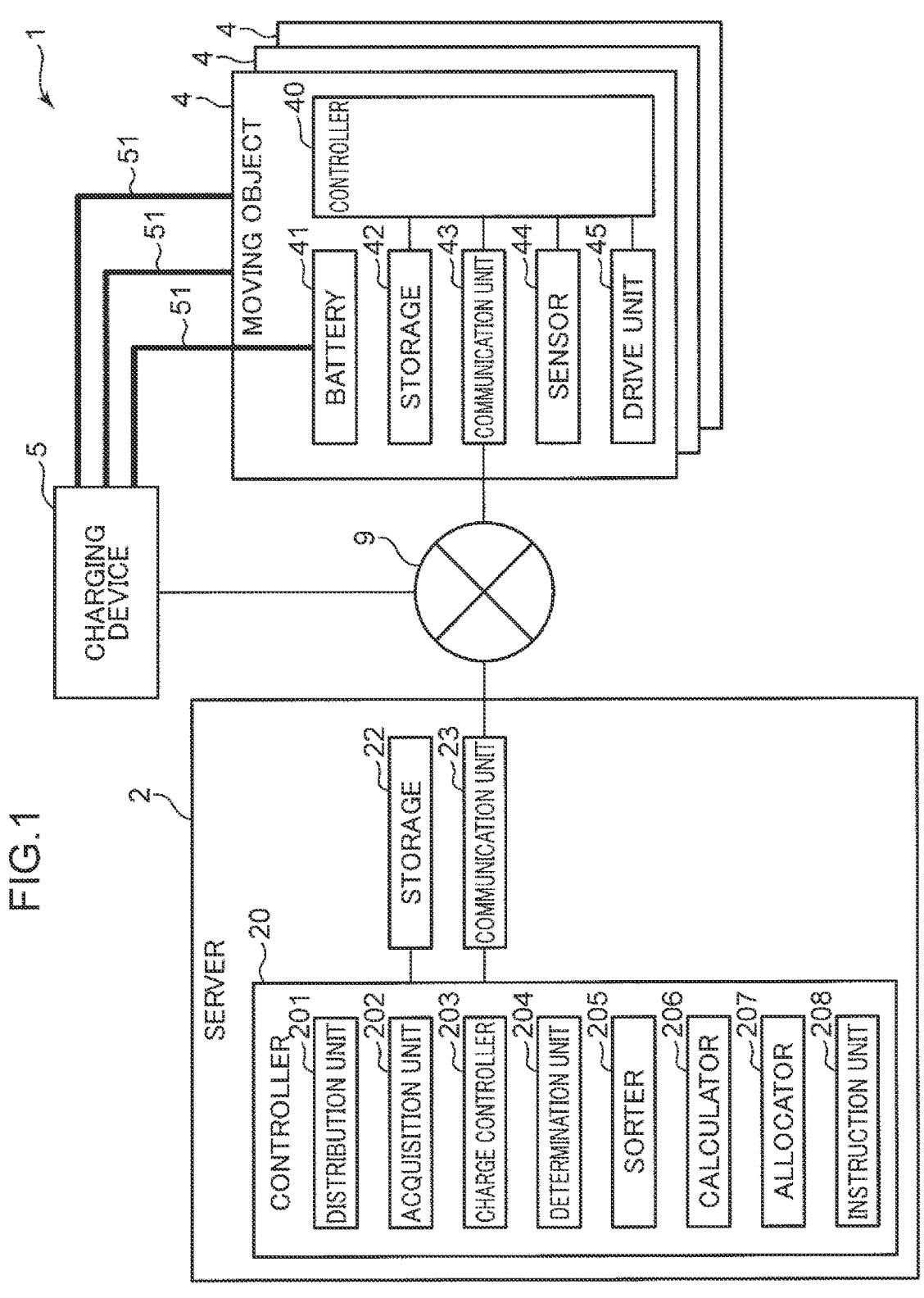
FIG. 1 is an overall configuration diagram of an automatic logistics system.

DESCRIPTION OF EMBODIMENTS (Knowledge Underlying the Present Disclosure)

As described above, in recent years, as disclosed in Patent Literature 1, for example, a technique in which a plurality of chargeable moving objects convey a plurality of cargos has become widespread. However, in a case where charging timings of the plurality of moving objects overlap with each other, it is necessary to charge the plurality of moving objects at a predetermined charging place simultaneously, and there is a possibility that a space near the charging place is compressed. It is therefore conceivable to provide a charging place capable of sufficiently accommodating the plurality of moving objects, but in this case, a problem that a space for arranging the cargos is reduced may occur. These problems may also interfere with movement of other moving objects not required to be charged in the conveyance work of the cargos.

Therefore, as a result of intensive studies on reducing opportunities for simultaneously charging a plurality of chargeable moving objects that convey a plurality of cargos, the number of moving objects being more than or equal to the number of moving objects that are simultaneously chargeable by the charging device, the present inventor has arrived at the following aspects of the present disclosure.

A control method according to one aspect of the present disclosure is a control method of controlling a plurality of moving objects that convey a plurality of cargos, the method including, by a computer, acquiring a residual battery capacity of the plurality of moving objects, determining a target residual battery capacity of the plurality of moving objects in a next unit of time, allocating a conveyance unit to each of the moving objects based on a residual battery capacity and a target residual battery capacity of each of the moving objects and a weight of each of the cargos, and transmitting, to each of the moving objects, control information instructing a conveyance work of the conveyance unit allocated to each of the moving objects.

In this aspect, the conveyance unit is allocated to each of the moving objects on the basis of the residual battery capacity of the plurality of moving objects, the target residual battery capacity in the next unit of time, and the weight of each of the cargos. Then, the conveyance work of the conveyance unit is instructed to each of the moving objects.

Thus, in this aspect, the conveyance unit can be allocated to each of the moving objects such that the residual battery capacity of the plurality of moving objects becomes the target residual battery capacity for every unit of time in consideration of the weight of each of the cargos, for example, by allocating the conveyance unit including a heavy cargo to a moving object having a larger difference between the residual battery capacity and the target residual battery capacity. Therefore, this aspect can reduce opportunities that the number of moving objects whose residual battery capacity is significantly lower than the target residual battery capacity becomes larger than or equal to the number of moving objects that are simultaneously chargeable by the charging device. As a result, this aspect can reduce opportunities for the charging device to simultaneously charge the plurality of chargeable moving objects conveying the plurality of cargos, the number of moving objects being more than or equal to the number of moving objects that are simultaneously chargeable.

In the above aspect, in the determining of the target residual battery capacity, the target residual battery capacity may be determined with the number of moving objects to be charged in the next unit of time being less than or equal to an upper limit number that is the number of moving objects that are simultaneously chargeable by the charging device.

In this aspect, the target residual battery capacity is determined with the number of moving objects to be charged in the next unit of time being less than or equal to the upper limit number. Therefore, in this aspect, by allocating the conveyance unit to each of the moving objects such that the residual battery capacity of the plurality of moving objects becomes the target residual battery capacity for every unit of time, it is possible to prevent the number of moving objects to be charged in each unit of time from becoming larger than or equal to the upper limit number. As a result, this aspect can avoid occurrence of an opportunity for simultaneously charging the upper limit number or more of moving objects.

In the above aspect, in the allocating of the conveyance unit to each of the moving objects, the residual battery capacity of each of the moving objects when each of the moving objects performs the conveyance work of the conveyance unit may be calculated based on the residual battery capacity of each of the moving objects and the weight of each of the cargos, and the conveyance unit to be allocated to each of the moving objects may be determined based on a difference between the residual battery capacity of each of the moving objects having been calculated and the target residual battery capacity of each of the moving objects.

In this aspect, the conveyance unit to be allocated to each of the moving objects is determined on the basis of the difference between the residual battery capacity of each of the moving objects and the target residual battery capacity when each of the moving objects performs the conveyance work of each conveyance unit, the difference being calculated on the basis of the residual battery capacity of each of the moving objects and the weight of each cargo.

Thus, in this aspect, the conveyance unit can be allocated to each of the moving objects such that the residual battery capacity of the plurality of moving objects in the next unit of time becomes a residual capacity close to the target residual battery capacity, for example, by allocating the conveyance unit to each of the moving objects so as to minimize a sum of difference in the plurality of moving objects. Therefore, this aspect can reduce opportunities that the number of moving objects whose residual battery capacity is significantly lower than the target residual battery capacity becomes larger than or equal to the number of moving objects that are simultaneously chargeable by the charging device. As a result, this aspect can reduce opportunities for simultaneously charging the moving objects, the number of which is more than or equal to the number of moving objects that are simultaneously chargeable by the charging device.

In the above aspect, in the determining of the target residual battery capacity, the plurality of moving objects may be divided into a plurality of groups having the upper limit number or less of moving objects, a charging timing of moving objects in an arbitrary k-th group among the plurality of groups may be set to be after k units of time, and a target residual battery capacity of the moving objects in the k-th group in the next unit of time may be determined with a residual battery capacity of the moving objects in the k-th group after the k units of time being a predetermined charge start residual battery capacity.

In this aspect, the plurality of moving objects are divided into the plurality of groups having the upper limit number or less of moving objects, and the moving objects in an arbitrary k-th group are charged after the k units of time. Therefore, in this aspect, the moving objects to be charged can be changed to the upper limit number or less of different moving objects for every unit of time.

In this aspect, the target residual battery capacity of the moving objects in the k-th group is determined such that the residual battery capacity of the moving objects in an arbitrary k-th group after the k units of time becomes the charge start residual battery capacity.

Thus, in this aspect, in consideration of the weight of each cargo, the residual battery capacity of each of the moving objects in the next unit of time can be limited to a residual capacity close to the target residual battery capacity such that the residual battery capacity becomes the charge start residual battery capacity when each of the moving objects is charged. Therefore, this aspect can avoid the necessity of charging each of the moving objects due to the residual battery capacity falling below the charge start residual battery capacity until each of the moving objects is charged at the timing corresponding to its own group. Further, it is possible to prevent the residual battery capacity from greatly exceeding the charge start residual battery capacity at the timing, and thus to perform charging efficiently. As a result, this aspect can avoid occurrence of an opportunity for simultaneously charging the upper limit number or more of moving objects among the plurality of moving objects.

In the above aspect, in the allocating of the conveyance unit to each of the moving objects, the conveyance unit may be allocated to each of the moving objects with a sum of the difference in the plurality of moving objects being minimized.

In this aspect, the conveyance unit is allocated to each of the moving objects with the sum of the difference in the plurality of moving objects being minimized.

Therefore, in this aspect, the conveyance unit can be allocated to each of the moving objects such that the residual battery capacity of each of the moving objects in the next unit of time becomes a residual capacity close to the target residual battery capacity. Therefore, this aspect can reduce opportunities that the number of moving objects whose residual battery capacity is significantly lower than the target residual battery capacity becomes larger than or equal to the number of moving objects that are simultaneously chargeable by the charging device. As a result, this aspect can reduce opportunities for simultaneously charging the moving objects, the number of which is more than or equal to the number of moving objects that are simultaneously chargeable by the charging device.

In this aspect, in the allocating of the conveyance unit to each of the moving objects, each of the cargos may be regarded as one conveyance unit, a required time for each of the moving objects to perform the conveyance work of the conveyance unit may be calculated based on a conveyance route of each of the cargos, and the conveyance unit may be allocated to each of the moving objects with a sum of the difference in the plurality of moving objects being minimized and with a sum of the required time in each of the moving objects being less than or equal to the unit of time.

In this aspect, the required time for each of the moving objects to perform the conveyance work of each conveyance unit is calculated on the basis of the conveyance route of each of the cargos. Then, the conveyance unit is allocated to each of the moving objects such that the sum of the difference in the plurality of moving objects is minimized and the sum of the required time in the moving objects is less than or equal to the unit of time.

Thus, in this aspect, in further consideration of the conveyance route of each of the cargos, the residual battery capacity of each of the moving objects in the next unit of time can be set to a residual capacity close to the target residual battery capacity, and it is possible to prevent each of the moving objects from performing the conveyance work of the cargos requiring the unit of time or more. Therefore, this aspect is suitable in a case where the cargos are conveyed by the plurality of moving objects in an environment with a biased time load of the conveyance work of each cargo.

In the above aspect, in the determining of the target residual battery capacity, the target residual battery capacity of the moving objects in a p-th group may be determined to be smaller than the target residual battery capacity of the moving objects in a q-th group to be charged after q units of time that are longer than p units of time.

In the above aspect, when the target residual battery capacity is determined, the target residual battery capacity of the moving objects in a p-th group is determined to be smaller than the target residual battery capacity of the moving objects in a q-th group to be charged after q units of time that are longer than p units of time.

Therefore, in this aspect, by limiting the residual battery capacity of each of the moving objects in the next unit of time to a residual capacity close to the target residual battery capacity determined as described above, the conveyance unit can be allocated to each of the moving objects such that a group of moving objects having shorter time until being charged consume more battery power. In other words, it is possible to save the battery of a group of moving objects having a long time until being charged and to reduce the possibility that the moving objects run out of the residual battery capacity by the next charging opportunity.

In the above aspect, a difference between the target residual battery capacity of the moving objects in the p-th group and the target residual battery capacity of the moving objects in the q-th group may be proportional to a difference between the p units of time and the q units of time.

In this aspect, the difference between the target residual battery capacity of the moving objects in the p-th group and the target residual battery capacity of the moving objects in the q-th group is proportional to the difference between the p units of time and the q units of time, and the target residual battery capacity of the moving objects in the p-th group is determined to be smaller than the target residual battery capacity of the moving objects in the q-th group charged after the q units of time which are longer than the p units of time.

Therefore, in this aspect, by limiting the residual battery capacity of each of the moving objects in the next unit of time to a residual capacity close to the target residual battery capacity determined as described above, the conveyance unit can be allocated to each of the moving objects such that a group of moving objects having shorter time until being charged have linearly more increased battery consumption.

In the above aspect, when the plurality of moving objects are divided into the plurality of groups, the plurality of moving objects may be equally divided into the plurality of groups.

This aspect can equally give a charging opportunity to the plurality of moving objects. Therefore, this aspect is suitable in a case where the cargos are conveyed by the plurality of moving objects in an environment with an equal time load of the conveyance work of each cargo.

In the above aspect, when the plurality of moving objects are divided into the plurality of groups, the plurality of moving objects may be divided into the plurality of groups such that the group to be charged when a work amount of the conveyance of the cargo is a first work amount has more moving objects than the group to be charged when the work amount is a second work amount that is larger than the first work amount.

This aspect can reduce the number of moving objects to be charged in a time zone with a large work amount, and increase the number of moving objects to be charged in a time zone with a small work amount. As a result, in this aspect, each of the moving objects can be efficiently charged, and the cargos can be efficiently conveyed to each of the moving objects.

In the above aspect, in the allocating of the conveyance unit to each of the moving objects, the plurality of cargos may be equally divided into a same number of conveyance units as a number of moving objects.

This aspect can cause each of the moving objects to equally convey the cargos. Therefore, this aspect is suitable in a case where the cargos are conveyed by the plurality of moving objects in an environment with an equal time load of the conveyance work of each cargo.

In the above aspect, the plurality of cargos may be a plurality of articles stored in a warehouse.

This aspect can reduce opportunities for the charging device to simultaneously charge the plurality of chargeable moving objects conveying the plurality of articles stored in the warehouse, the number of moving objects being more than or equal to the number of moving objects that are simultaneously chargeable.

In the above aspect, the plurality of cargos may be a plurality of parts stored in a factory.

This aspect can reduce opportunities for the charging device to simultaneously charge the plurality of chargeable moving objects conveying the plurality of parts stored in the factory, the number of moving objects being more than or equal to the number of moving objects that are simultaneously chargeable.

In the above aspect, the plurality of cargos may be a plurality of container cargos stored in a harbor.

This aspect can reduce opportunities for the charging device to simultaneously charge the plurality of chargeable moving objects conveying the plurality of container cargos stored in the harbor, the number of moving objects being more than or equal to the number of moving objects that are simultaneously chargeable.

The present disclosure can also be implemented as a program that causes a computer to execute each characteristic configuration included in the control method according to the above one aspect, or a control device that operates by the program. It goes without saying that such a computer program can be distributed via a computer-readable non-transitory recording medium such as a CD-ROM or a communication network such as the Internet.

Embodiment

Hereinafter, an automatic logistics system according to an embodiment of the present disclosure will be described with reference to the drawings. FIG. 1 is an overall configuration diagram of an automatic logistics system 1. The automatic logistics system 1 is a system that controls conveyance of a plurality of cargos by a plurality of chargeable moving objects 4 and controls charge of the plurality of moving objects 4.

For example, the automatic logistics system 1 is applicable to a system that controls a plurality of chargeable robots to convey a plurality of articles stored in a warehouse or a plurality of parts stored in a factory and controls charge of the plurality of robots. For example, the automatic logistics system 1 is applicable to a system that controls a plurality of chargeable electric vehicles to convey a plurality of container cargos stored in a harbor and controls charge of the plurality of electric vehicles.

Specifically, as illustrated in FIG. 1, the automatic logistics system 1 includes the plurality of moving objects 4, a charging device 5, and a server 2.

Each of the moving objects 4 conveys an instructed cargo in accordance with control information received from the server 2 with charging power charged in a battery 41. Specifically, the moving object 4 includes the battery 41, a storage 42, a communication unit 43, a sensor 44, a drive unit 45, and a controller 40.

The battery 41 includes a chargeable secondary battery. The battery 41 is connected to a charging connector provided on an outer surface of a body of the moving object 4. When the charging connector is connected to a connector of a charging cable 51 connected to the charging device 5, the battery 41 is charged with power supplied from the charging device 5 via the charging cable 51. The battery 41 supplies the charged power to each part of the moving object 4.

The storage 42 includes a non-volatile memory that stores a predetermined control program and a memory such as a RAM that temporarily stores information. The storage 42 stores various information related to control of the moving object 4 under control of the controller 40. Note that various information related to the control of the moving object 4 may be stored in the storage 42 in advance.

For example, the various information related to the control of the moving object 4 include map information of an environment in which the moving object 4 conveys the cargo, weight information indicating a weight of each cargo, work information related to the conveyance work of each cargo, and control information instructing the conveyance work of the cargo. The map information includes information indicating a storage place and an unloading place of the cargo existing in the environment, information indicating a conveyance route from the storage place to the unloading place of the cargo, information indicating an installation place of the charging device 5, and the like. The work information includes information indicating a storage position of each cargo in the storage place and a cargo unloading position of each cargo in the unloading place, and information related to a conveyance schedule of each cargo. The information related to the conveyance schedule of each cargo includes, for example, information indicating a time zone in which the conveyance work of each cargo is performed. The control information instructing the conveyance work of the cargo includes, for example, identification information of the cargo to be conveyed by the moving object 4.

The communication unit 43 includes a communication interface circuit for communicating with an external device such as the server 2. The communication unit 43 outputs information received from the external device to the controller 40, and transmits the information input from the controller 40 to the external device.

The sensor 44 includes, for example, a light detection and ranging (LiDAR) sensor, an image sensor, and/or a global positioning system (GPS) sensor, and detects a current position, a moving direction, and a moving distance of the moving object 4. The sensor 44 further includes a residual battery capacity sensor, and detects an amount of power charged in the battery 41 (hereinafter, residual battery capacity).

The drive unit 45 includes a drive motor (not illustrated) that controls a direction and rotation of a plurality of wheels provided on a bottom surface of the body of the moving object 4. The drive unit 45 moves or stops the moving object 4 in a designated direction under the control of the controller 40.

The controller 40 includes a processor such as a central processing unit (CPU). The controller 40 controls each part of the moving object 4 by executing the control program stored in the storage 42.

For example, upon receipt of the map information, the weight information, and the work information transmitted from the server 2 by the communication unit 43, the controller 40 stores the received map information, weight information, and work information in the storage 42.

Upon receipt of the control information indicating an instruction to charge by the communication unit 43, the controller 40 controls the drive unit 45 to move the moving object 4 to the installation place of the charging device 5 on the basis of the map information stored in the storage 42 and the moving direction and the moving distance of the moving object 4 detected by the sensor 44, and then further moves the moving object 4 until the charging connector connected to the battery 41 is connected to the connector of the charging cable 51 connected to the charging device 5. As a result, the charging device 5 and the moving object 4 are connected to each other. In this state, power is supplied from the charging device 5 to the battery 41 via the charging cable 51, and the battery 41 is charged.

Upon receipt of the control information indicating an instruction to transmit the residual battery capacity transmitted from the server 2 by the communication unit 43, the controller 40 causes the communication unit 43 to return a signal indicating the residual battery capacity detected by the sensor 44 to the server 2. Note that the present disclosure is not limited thereto, and the controller 40 may periodically transmit the signal indicating the residual battery capacity to the server 2 by the communication unit 43.

Upon receipt of the control information instructing the conveyance work of the cargo by the communication unit 43, the controller 40 temporarily stores the control information in the storage 42. The controller 40 controls the drive unit 45 to perform the conveyance work of the cargo instructed by the control information on the basis of the control information stored in the storage 42, the map information, and the moving direction and the moving distance of the moving object 4 detected by the sensor 44.

Specifically, in the conveyance work of the cargo, the controller 40 moves the moving object 4 to the storage place of the cargo instructed by the control information. The controller 40 controls a picking mechanism (not illustrated) to acquire the cargo from the predetermined storage position in the storage place, and places the acquired cargo on a cargo bed provided in an upper part of the body of the moving object 4 or the like. The controller 40 controls the drive unit 45 to move the moving object 4 to the unloading place of the cargo placed on the cargo bed. The controller 40 controls the picking mechanism (not illustrated) to move the cargo placed on the cargo bed to the predetermined unloading position in the unloading place.

The charging device 5 includes an AC/DC converter and/or a DC/DC converter. A predetermined number of charging cables 51 have one end electrically connected to the charging device 5. When the connector provided at the other end of the charging cables 51 and the charging connector provided on the outer surface of the body of the moving object 4 are connected to each other, the charging device 5 converts power supplied from a commercial power source into predetermined AC power or DC power, and supplies the converted power to the battery 41 of the moving object 4 via the charging cables 51. Thus, the charging device 5 charges the battery 41 of the moving object 4. In this manner, the charging device 5 is configured to be able to simultaneously charge the predetermined number or less of moving objects 4 connected to the predetermined number of charging cables 51. Hereinafter, the number of moving objects 4 that are simultaneously chargeable by the charging device 5 is referred to as a chargeable upper limit number.

The charging device 5 is configured to be communicable with the server 2. The charging device 5 controls supply and stop of power to the moving object 4 in accordance with the control information received from the server 2. The charging device 5 may adjust the amount of power or the like to be supplied to the moving object 4 in accordance with the control information received from the server 2.

The server 2 communicates with the plurality of moving objects 4 and the charging device 5 via a network 9 to perform conveyance control for controlling the plurality of moving objects 4 to convey the plurality of cargos and charge control for controlling the charging device 5 to charge the plurality of moving objects 4.

Specifically, the server 2 includes a storage 22, the communication unit 23, and the controller 20.

The storage 22 includes a non-volatile memory that stores a predetermined control program and a memory such as a RAM that temporarily stores information, and stores various information related to the conveyance control and the charge control.

For example, the storage 22 stores in advance map information of the environment in which the moving objects 4 convey the cargos. The map information includes information indicating a storage place and an unloading place of the cargo existing in the environment, information indicating a conveyance route from the storage place to the unloading place of the cargo, information indicating an installation place of the charging device 5, and the like.

The storage 22 stores in advance the weight information indicating the weight of each cargo. The storage 22 further stores in advance the work information related to the conveyance work of each cargo. The work information stores in advance information indicating a storage position of each cargo in the storage place and a cargo unloading position of each cargo in the unloading place, and information related to a conveyance schedule of each cargo. The information related to the conveyance schedule of each cargo includes, for example, information indicating a time zone in which the conveyance work of each cargo is performed.

The storage 22 further stores in advance power amount information related to power consumption amount of the moving objects 4. The power amount information includes, for each of a plurality of predetermined weight ranges, information indicating a power amount required to lift and lower a cargo having a weight in each weight range by a unit distance, information indicating a power amount required to move the moving objects 4 by a unit distance, and the like.

The storage 22 further stores in advance speed information related to speed of the moving objects 4. The speed information includes, for each of a plurality of predetermined weight ranges, information indicating time required to lift and lower a cargo having a weight in each weight range by a unit distance, information indicating time required to move the moving objects 4 by a unit distance, and the like.

The communication unit 23 includes a communication interface circuit for communicating with an external device such as the moving objects 4. The communication unit 23 outputs information received from the external device to the controller 20, and transmits the information input from the controller 20 to the external device.

The controller 20 includes a microcomputer (computer) provided with a CPU and the like. The controller 20 controls an operation of each part of the server 2 by executing the control program stored in the storage 22.

For example, the controller 20 controls the communication unit 23 to transmit the map information, the weight information, and the work information stored in the storage 22 to the plurality of moving objects 4. When the controller 40 of each moving object 4 acquires the map information, the weight information, and the work information via the communication unit 43, the controller 40 stores the acquired map information, weight information, and work information in the storage 42.

The controller 20 functions particularly as a distribution unit 201, an acquisition unit 202, a charge controller 203, a determination unit 204, a sorter 205, a calculator 206, an allocator 207, and an instruction unit 208 by executing the control program stored in the storage 22. The acquisition unit 202, the distribution unit 201, the charge controller 203, the determination unit 204, the sorter 205, the calculator 206, the allocator 207, and the instruction unit 208 will be described in detail later.

Figure 2:
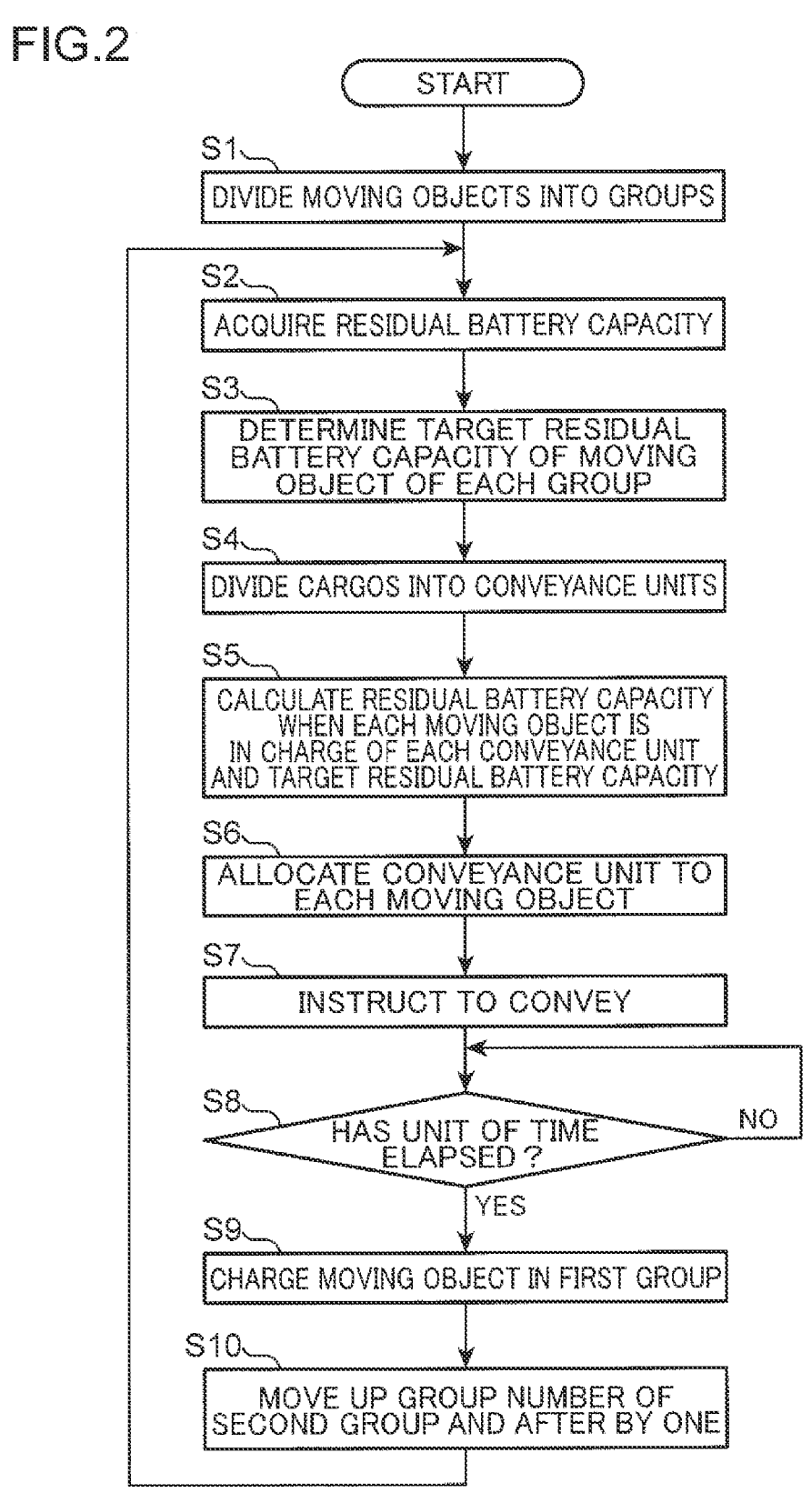
FIG. 2 is a flowchart illustrating an example of an operation of controlling a plurality of moving objects and a charging device.

Next, an operation in which the controller 20 controls the moving object 4 and the charging device 5 will be described. In the following description, the acquisition unit 202, the distribution unit 201, the charge controller 203, the determination unit 204, the sorter 205, the calculator 206, the allocator 207, and the instruction unit 208 will be described in detail. FIG. 2 is a flowchart illustrating an example of an operation of controlling the plurality of moving objects 4 and the charging device 5.

As illustrated in FIG. 2, in the server 2, when the controller 20 starts the operation of controlling the moving objects 4 and the charging devices 5, the distribution unit 201 divides the plurality of moving objects 4 into a plurality of groups having the chargeable upper limit number or less of moving objects 4 that are simultaneously chargeable by the charging device 5 (step S1). Hereinafter, the number of groups divided in step S1 is set to K (K is an integer of two or more).

For example, as will be described later, the moving objects 4 in an arbitrary k-th (k is an integer of one or more and K or less) group among K groups divided in step S1 are charged by the charging device 5 after k units of time. Hereinafter, the k-th group is referred to as a group with a group number k.

In step S1, the distribution unit 201 refers to, for example, information related to the conveyance schedule of each cargo and stored in the storage 22, and divides the plurality of moving objects 4 into K groups such that the group to be charged when a work amount of the conveyance of the cargo is a first work amount has more moving objects 4 than the group to be charged when the work amount is a second work amount that is larger than the first work amount. As a result, a large number of moving objects 4 can perform the conveyance work of the cargos during a time when the work amount is large and a large number of moving objects 4 can be charged during a time when the work amount is small.

Figure 3:
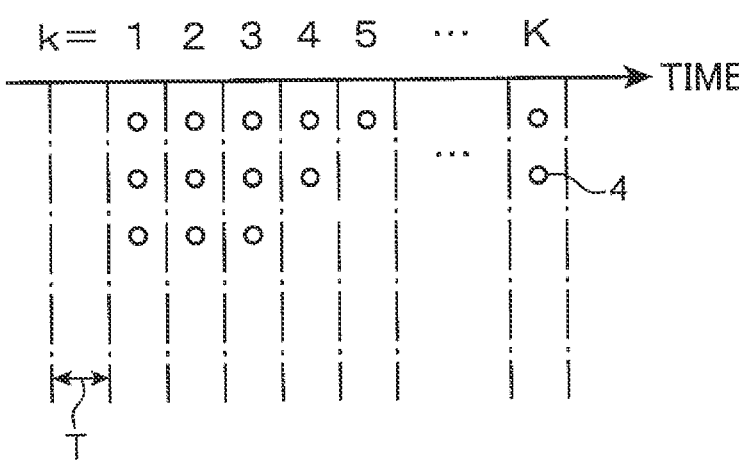
FIG. 3 is a diagram illustrating an example of dividing the plurality of moving objects into a plurality of groups.

FIG. 3 is a diagram illustrating an example of dividing the plurality of moving objects 4 into the plurality of groups. In FIG. 3, a horizontal axis represents time, and a time zone corresponding to k=1 divided by a one-dot chain line in FIG. 3 represents a unit of time T from after one unit of time T until after two units of time T. Similarly, a time zone corresponding to k=2 represents a unit of time T from after two units of time T until after three units of time T. A time zone corresponding to k=K in FIG. 3 represents a unit of time T from after K units of time T until after (K+1) units of time T. Note that the unit of time T represents a processing unit of the controller 20, and represents an interval at which the processing of steps S2 to S10 illustrated in the flowchart in FIG. 2 is repeated. Therefore, in steps S7 and S9 to be described later, control information to be described later is transmitted every unit of time T.

For example, it is assumed that the work amount of the conveyance of the cargo from after five units of time T until after six units of time T is the largest, and the work amount of the conveyance of the cargo from after four units of time T until after five units of time T is the second largest. The work amount during the other time is assumed to be less than the work amount of the conveyance of the cargo from after four units of time T until after five units of time T.

In this case, for example, as illustrated in FIG. 3, the distribution unit 201 distributes one moving object 4 to the fifth group that is charged after five units of time T in which the work amount is the largest. The distribution unit 201 distributes two moving objects 4 to the fourth group that is charged after four units of time T, the two moving objects 4 being more than those in the fifth group charged after five units of time T in which the work amount is the largest. The distribution unit 201 distributes three moving objects 4 to the other groups, the three moving objects 4 being larger than those in the fourth group charged after four units of time T.

Note that the present disclosure is not limited thereto, and in step S1, the distribution unit 201 may equally divide the plurality of moving objects 4 into K groups such that each group has the same number of moving objects 4 that is the chargeable upper limit number or less.

Next, the acquisition unit 202 acquires the residual battery capacity of the plurality of moving objects 4 (step S2). Specifically, in step S2, the acquisition unit 202 controls the communication unit 23 to transmit the control information indicating the instruction to transmit the residual battery capacity to the plurality of moving objects 4. In response to this, as described above, when the information indicating the residual battery capacity is returned from the plurality of moving objects 4, the acquisition unit 202 acquires the returned information indicating the residual battery capacity of the plurality of moving objects 4 via the communication unit 23.

Next, the determination unit 204 determines a target value of the residual battery capacity of the moving objects 4 of the k-th group at the next unit of time T (hereinafter, a target residual battery capacity) for setting the residual battery capacity of the moving objects 4 in the arbitrary k-th group after k units of time to a residual battery capacity at a predetermined start time of charging (hereinafter, charge start residual battery capacity) (step S3).

Figure 4:
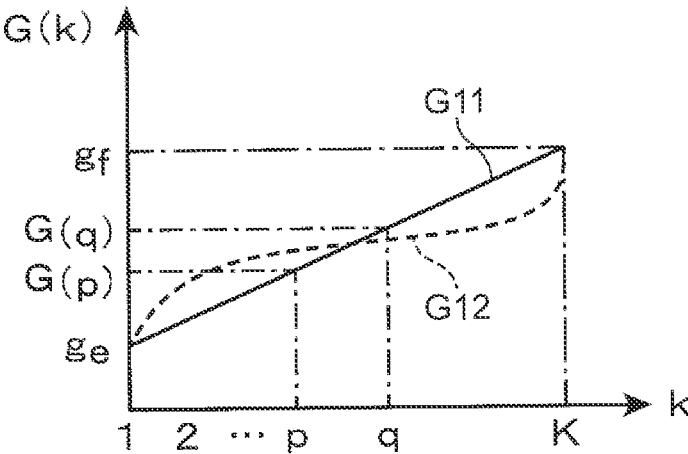
FIG. 4 is a diagram illustrating an example of functions used for determining a target residual battery capacity.

FIG. 4 is a diagram illustrating an example of functions G11 and G12 used for determining the target residual battery capacity. For example, as illustrated in FIG. 4, the storage 22 of the server 2 stores information indicating the functions G11 and G12 used to determine the target residual battery capacity of the moving object 4 in each group. In FIG. 4, a horizontal axis represents the group number k, and a vertical axis represents the target residual battery capacity G (k) of the moving object 4 of the group of the group number k (k-th group).

In FIG. 4, $g_e$ represents the charge start residual battery capacity. Note that the charge start residual battery capacity is determined to be, for example, a minimum amount of power required to move the moving object 4 to the charging device 5 and connect the moving object 4 to the charging device 5. Further, gr represents a residual battery capacity at a predetermined time of completion of charging (hereinafter, charge completion residual battery capacity). The charge completion residual battery capacity is determined to be, for example, a residual battery capacity when the battery 41 is fully charged.

The determination unit 204 determines a target residual battery capacity G (1) of the moving object 4 in a first group to the charge start residual battery capacity $g_e$ in order to set the residual battery capacity of the moving object 4 in the first group after one unit of time T, that is the residual battery capacity of the moving object 4 in the first group in the next unit of time T, to the charge start residual battery capacity $g_e$.

The determination unit 204 determines the target residual battery capacity G (K) of the moving object 4 in the K-th group as the charge completion residual battery capacity gr in order to set the residual battery capacity of the moving object 4 in the K-th group after the K units of time T, which is the longest time until the next charge, to the charge start residual battery capacity $g_e$, that is, in order to cause the moving object 4 in the K-th group to perform the conveyance work of the cargo without the residual battery capacity falling below the charge start residual battery capacity $g_e$ until after the K units of time T.

The determination unit 204 determines the target residual battery capacity G (k) of the moving object 4 in the group to be smaller as the group number k is smaller. For example, the determination unit 204 uses the function G11 illustrated in FIG. 4 to determine the target residual battery capacity G (p) of the moving object 4 in a p-th group to be smaller than the target residual battery capacity G (q) of the moving object 4 in a q-th group to be charged after q units of time 1' which are longer than p units of time T.

Note that the determination unit 204 uses the function G11 illustrated in FIG. 4 to determine the target residual battery capacity of each group such that a difference between the target residual battery capacity G (p) of the moving object 4 in the p-th group and the target residual battery capacity G (q) of the moving object 4 in the q-th group is proportional to a difference between the p units of time T and the q units of time T. Accordingly, the target residual battery capacity of the moving object 4 in the group is linearly decreased as the group number is smaller.

Note that the present disclosure is not limited thereto, and the determination unit 204 may use the function G12 illustrated in FIG. 4 to determine the target residual battery capacity G (k) of the moving object 4 in the group to be smaller as the group number k is smaller. When using the function G12, the target residual battery capacity G (k) of the moving object 4 in the group of which group number k is close to one can be determined to be excessively small.

Next, the sorter 205 divides the plurality of cargos into a plurality of conveyance units (step S4).

For example, it is assumed that the plurality of cargos are a plurality of articles stored in the warehouse. In this case, regardless of which cargo is conveyed by the moving object 4, the required time for the conveyance work is considered to be the same on average. Therefore, it may not be necessary to consider a situation in which the plurality of moving objects 4 have no time for performing the conveyance work of other cargos because of having performed the conveyance work of a certain cargo. In such a case, the sorter 205 equally divides the plurality of cargos into the same number of conveyance units as the number of moving objects 4 in descending order of the amount of power required for the conveyance work. Hereinafter, the conveyance units are referred to as work categories.

Specifically, the sorter 205 calculates the amount of power required for the conveyance work of each cargo on the basis of the map information, weight information, work information, and power amount information stored in advance in the storage 22.

For example, the sorter 205 calculates, by using the power amount information, a first power amount necessary for moving the moving object 4 to the storage place indicated by the map information and a second power amount necessary for causing the moving object 4 to acquire the cargo having the weight indicated by the weight information from the storage place indicated by the work information. The sorter 205 further calculates, by using the power amount information, a third power amount necessary for moving the moving object 4 from the storage place to the unloading place indicated by the map information and a fourth power amount necessary for causing the moving object 4 to move the cargo having the weight indicated by the weight information to the unloading position indicated by the work information.

The sorter 205 calculates a sum of the calculated first power amount, the second power amount, the third power amount, and the fourth power amount as the power amount required for the conveyance work of each cargo. However, the present disclosure is not limited thereto, and the sorter 205 may calculate a sum of the power amounts including at least the second power amount and the fourth power amount based on the weight of the cargos among the first power amount, the second power amount, the third power amount, and the fourth power amount as the power amount required for the conveyance work of each cargo.

Here, assuming that the number of moving objects 4 is N and the number of cargos is M, the sorter 205 equally sorts M cargos into N work categories by M/N in descending order of the calculated power amount required for the conveyance work. Subsequently, N work categories are referred to as a first work category, a second work category, . . . , and an N-th work category in order of the work category into which the cargo requiring a larger power amount for the conveyance work is sorted.

Next, the calculator 206 calculates a difference $c_{ij}$ between a residual battery capacity of an arbitrary i-th moving object among the plurality of moving objects 4 and a target residual battery capacity of the i-th moving object when the i-th moving object performs conveyance work of an arbitrary j-th conveyance unit among the plurality of conveyance units on the basis of the residual battery capacity of the plurality of moving objects 4 acquired in step S2, the target residual battery capacity of the plurality of moving objects 4 calculated in step S3, and the power amount necessary for the conveyance work of each cargo (step S5).

Figure 5:
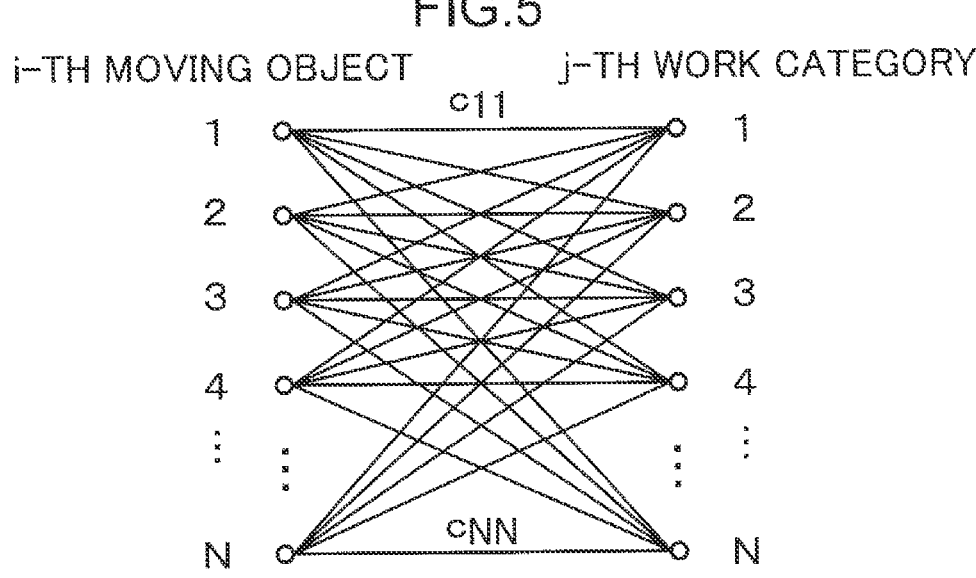
FIG. 5 is a diagram illustrating an example of a difference between a residual battery capacity of an i-th moving object and a target residual battery capacity when the i-th moving object performs conveyance work of a j-th work category.

FIG. 5 is a diagram illustrating an example of the difference $c_{ij}$ between the residual battery capacity of the i-th moving object and the target residual battery capacity when the i-th moving object performs the conveyance work of a j-th work category. For example, it is assumed that M cargos are sorted into N work categories in step S5 as described above. In this case, as illustrated in FIG. 5, the calculator 206 calculates the difference $c_{ij}$ (for example, $c_{11}$) between the residual battery capacity of the i-th moving object and the target residual battery capacity of the i-th moving object when the arbitrary i-th moving object (for example, the first moving object) performs the conveyance work of M/N cargos included in the arbitrary j-th work category (for example, the first work category) by using the following Equation (1).

$$c_{ij}=|(B_i-P_j)-G(g_i)| \tag{1}$$

In Equation (1), $B_i$ represents the residual battery capacity of the i-th moving object acquired in step S2. $P_j$ represents a sum of the power amount required for the conveyance work of the cargo included in the j-th work category. The power amount necessary for the conveyance work of the cargo may be calculated by the sorter 205 in step S4, or may be calculated by the calculator 206 as in step S4. The power amount required for the conveyance work of the cargo only needs to include at least the second power amount and the fourth power amount based on the weight of the cargo. In Equation (1), $g_i$ represents a group number of a group including the i-th moving object. G ($g_i$) represents the target residual battery capacity of the moving object 4 in the $g_i$-th group including the i-th moving object, the target residual battery capacity being determined in step S3.

Next, the allocator 207 allocates the conveyance unit to each of the moving objects 4 such that a sum of the difference $c_{ij}$ in the plurality of moving objects 4 calculated in step S5 is minimized (step S6).

Specifically, as described above, it is assumed that M cargos are sorted into N work categories in step S5, and the difference $c_{ij}$ between the residual battery capacity and the target residual battery capacity of the i-th moving object when the arbitrary i-th moving object performs the conveyance work of the arbitrary j-th work category is calculated in step S6 using the above Equation (1). In this case, the allocator 207 formulates a combinatorial optimization problem of the i-th moving object and the j-th work category in which a work category is allocated to each moving object such that the sum of the difference $c_{ij}$ in N moving objects 4 is minimized, for example, as shown in the following Equation (2).

[Formula 1]

$$\min \sum_{i,j} c_{ij} x_{ij} \qquad (2)$$

$$\text{s.t.} \sum_i x_{ij} = 1$$

$$\sum_j x_{ij} = 1$$

where $$x_{ij} = \begin{cases} 1 \text{ if } i\text{-th moving object is in charge of } j\text{-th work category} \\ 0 \text{ otherwise} \end{cases}$$

$$c_{ij} = \begin{array}{l} \text{difference between residual battery capacity when } i\text{-th} \\ \text{moving object is in charge of } j\text{-th work category} \\ \text{and target residual battery capacity} \end{array}$$

Then, the allocator 207 calculates an optimum combination of the i-th moving object and the j-th work category satisfying Equation (2) by executing a program of a known general-purpose solver stored in the storage 22. Accordingly, the allocator 207 allocates an optimum j-th work category to the i-th moving object in accordance with the calculated combination. The present disclosure is not limited thereto, and the allocator 207 may calculate a combination of the i-th moving object and the j-th work category such that the sum of the difference $c_{ij}$ in N moving objects 4 is minimized by performing processing according to an iterative algorithm that solves a known minimum cost flow problem.

Next, the instruction unit 208 controls the communication unit 23 to transmit, to each moving object 4, control information for instructing the conveyance work of the conveyance unit allocated to each moving object 4 in step S6 (step S7). As a result, in each moving object 4, upon receipt of the control information by the communication unit 43, the controller 40 causes the moving object 4 to perform the conveyance work of the conveyance unit indicated by the control information.

For example, it is assumed that the conveyance work of the first work category is allocated to the first moving object in step S6. In this case, in step S7, the instruction unit 208 transmits control information for instructing the first moving object to perform the conveyance work of the first work category. As a result, in the first moving object 4, upon receipt of the control information by the communication unit 43, the controller 40 causes the moving object 4 to perform the conveyance work of all the cargos included in the first work category indicated by the control information.

After step S7, when the unit of time T has elapsed (YES in step S8), the charge controller 203 transmits control information indicating an instruction of charging to the moving object 4 in the first group (step S9).

As a result, upon receipt of the control information indicating the instruction of charging by the communication unit 43 in the moving object 4 of the first group, as described above, the moving object 4 moves to the installation place of the charging device 5 under the control of the controller 40, and further moves until the connector provided at the other end of the charging cable 51 and the charging connector provided on the outer surface of the body of the moving object 4 are connected to each other. Thereafter, power is supplied from the charging device 5 to the moving object 4 via the charging cable 51, and thus the battery 41 of the moving object 4 is charged.

Next, the distribution unit 201 changes the second to K−1th groups that are not currently charged to the first to K−1th groups of which group numbers are decreased by 1. The distribution unit 201 changes the original first group that is charged to the K-th group (step S10). As a result, every time the unit of time T elapses, a charging opportunity is sequentially given to the chargeable upper limit number or less of moving objects 4 divided into each group. After step S10, the processing in and after step S2 is repeated.

The above aspect is merely an example of the embodiment according to the present disclosure, and is not intended to limit the present disclosure to the above aspect. For example, modified embodiments described below may be adopted.

In the above embodiment, in step S4 (FIG. 2), an example has been described in which a plurality of cargos are divided into the same number of work categories as the number of moving objects 4, assuming that the plurality of cargos are a plurality of articles stored in the warehouse.

However, the configuration of the above embodiment is also applicable to a case where a plurality of cargos are a plurality of parcels or mails delivered from a delivery center to houses of individuals by a plurality of chargeable electric vehicles. In this case, in step S4, for example, the sorter 205 only needs to divide the plurality of cargos into the same number of conveyance units as the number of moving objects 4 in accordance with a distance from the delivery center to a conveyance destination. Alternatively, the sorter 205 may divide the plurality of cargos into the same number of conveyance units as the number of moving objects 4 such that the cargos whose addresses of conveyance destinations are the same are in the same conveyance unit. In this case, it is possible to avoid overlapping of charging timings of the plurality of electric vehicles belonging to the delivery center.

For example, it is assumed that the plurality of electric vehicles that are chargeable at a harbor or the like perform the conveyance work of a plurality of container cargos or a plurality of robots that are chargeable at a factory or the like perform the conveyance work of a plurality of components. In such a case, the plurality of moving objects may have no time for performing the conveyance work of other cargos because of having performed the conveyance work of a certain cargo by conveying the cargo over a long distance, conveying a cargo with a large weight, or the like. In a case where a plurality of electric vehicles that are chargeable at a harbor or the like perform the conveyance work of a plurality of container cargos, power required for performing the conveyance work of other cargos may be lost because the electric vehicles have performed the conveyance work of a cargo with a significantly large weight. In consideration of the above cases, the sorter 205 may divide each of the plurality of cargos as one conveyance unit in step S4. As a result, the plurality of moving objects 4 may efficiently convey the cargo in an environment with a biased time load of the conveyance work of each cargo and a biased weight of each cargo.

In this case, in step S5 (FIG. 2), the calculator 206 calculates, as follows, a difference $c_{ij}$ between a residual battery capacity of an arbitrary i-th moving object among the plurality of moving objects 4 and a target residual battery capacity of the i-th moving object when the i-th moving object performs conveyance work of an arbitrary j-th conveyance cargo among the plurality of cargos on the basis of the residual battery capacity of the plurality of moving objects 4 acquired in step S2, the target residual battery capacity of the plurality of moving objects 4 calculated in step S3, and the power amount necessary for the conveyance work of each cargo.

Figure 6:
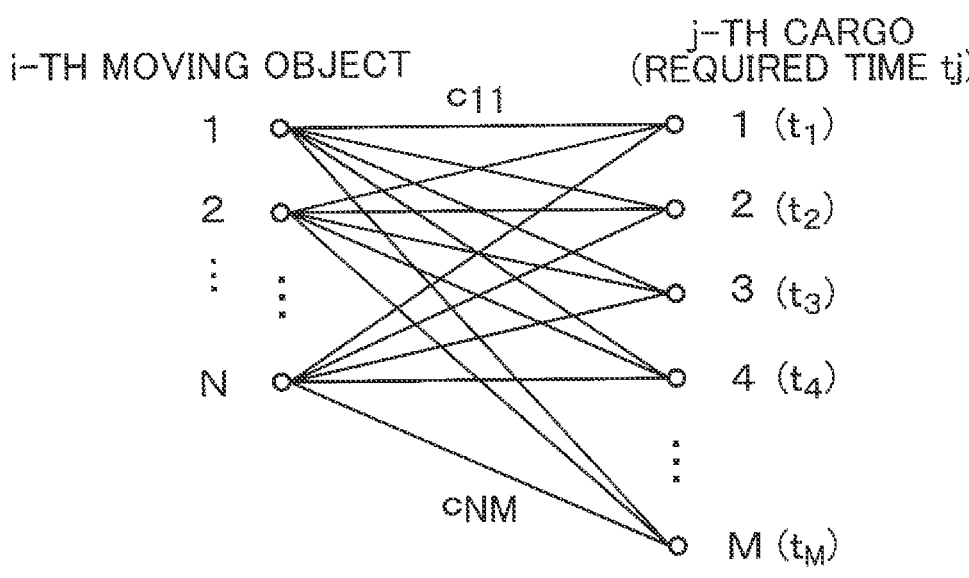
FIG. 6 is a diagram illustrating an example of a difference between a residual battery capacity of the i-th moving object and a target residual battery capacity and a required time for conveyance work of a j-th cargo when the i-th moving object performs the conveyance work of the j-th cargo.

FIG. 6 is a diagram illustrating an example of the difference $c_{ij}$ between the residual battery capacity of the i-th moving object and the target residual battery capacity and a required time $t_j$ for the conveyance work of the j-th cargo when the i-th moving object performs the conveyance work of the j-th cargo. Specifically, as illustrated in FIG. 6, the calculator 206 calculates the difference $c_{ij}$ (for example, $c_{11}$) between the residual battery capacity of the i-th moving object and the target residual battery capacity of the i-th moving object when the arbitrary i-th moving object (for example, the first moving object) performs the conveyance work of the arbitrary j-th cargo (for example, the first cargo) by using the following Equation (3).

$$c_{ij}=|(B_i-P'_j)-G(g_i)| \tag{3}$$

In Equation (3), $B_i$ represents the residual battery capacity of the i-th moving object acquired in step S2. $P'_j$ represents a power amount required for the conveyance work of the j-th cargo. The calculator 206 calculates the power amount required for the conveyance work of the j-th cargo as in the above embodiment. The power amount required for the conveyance work of the cargo only needs to include at least the second power amount and the fourth power amount based on the weight of the cargo. Here, $g_i$ represents a group number of a group including the i-th moving object. G ($g_i$) represents the target residual battery capacity of the moving object 4 in the $g_i$-th group including the i-th moving object, the target residual battery capacity being determined in step S3.

In the present modified embodiment, as illustrated in FIG. 6, the calculator 206 further calculates the required time $t_j$ for the i-th moving object to perform the conveyance work of the j-th cargo in step S5 on the basis of the map information, the work information, and the speed information stored in advance in the storage 22.

Specifically, the calculator 206 calculates, by using speed information, a first time required for moving the moving object 4 to the storage place indicated by the map information and a second time required for causing the moving object 4 to acquire the j-th cargo from the storage position indicated by the work information. The calculator 206 calculates, using the speed information, a third time required for moving the moving object 4 from the storage place to the unloading place in accordance with the conveyance route of each cargo included in the map information, and a fourth time required for causing the moving object 4 to move the j-th cargo to the unloading position indicated by the work information. The calculator 206 calculates a sum of the calculated first time, second time, the third time, and the fourth time as the required time $t_j$. Note that the present disclosure is not limited thereto, and the calculator 206 may calculate, as the required time $t_j$, a sum of times including at least the third time based on the conveyance route of each cargo among the first time, the second time, the third time, and the fourth time.

In step S6 (FIG. 2), the allocator 207 allocates the cargo to each of the moving objects 4 such that the sum of the difference $c_{ij}$ in the plurality of moving objects 4 calculated in step S5 is minimized and the required time $t_j$ in each of the moving objects 4 calculated in step S5 is less than or equal to the unit of time T.

Specifically, the allocator 207 formulates a combinatorial optimization problem of the i-th moving object and the j-th cargo, in which the cargo is allocated to each moving object 4 such that the sum of the difference $c_{ij}$ in the plurality of moving objects 4 calculated in step S5 is minimized and the required time $t_j$ in each moving object 4 calculated in step S5 is less than or equal to the unit of time T, for example, as shown in the following Equation (4).

[Formula 2]

$$\min \sum_{i,j} c_{ij}x_{ij} \tag{4}$$

$$\text{s.t.} \sum_i t_j x_{ij} \le T$$

$$\sum_j x_{ij} = 1$$

where $x_{ij} = \begin{cases} 1 & \text{if } i\text{-th moving object is in charge of } j\text{-th cargo} \\ 0 & \text{otherwise} \end{cases}$ $c_{ij} = $ difference between residual battery capacity when $i$-th moving object is in charge of $j$-th cargo $t_j = $ required time for conveyance work of $j$-th cargo $T = $ unit of time Then, the allocator 207 calculates an optimum combination of the i-th moving object and the j-th cargo satisfying Equation (4) by executing a program of a known general-purpose solver stored in the storage 22. Accordingly, the allocator 207 allocates an optimum j-th cargo to the i-th moving object in accordance with the calculated combination. The present disclosure is not limited thereto, and the allocator 207 may calculate a combination of the i-th moving object and the j-th cargo such that the sum of the difference $c_{ij}$ in the plurality of moving objects 4 is minimized and the required time $t_j$ in each moving object 4 is less than or equal to the unit of time T by performing processing according to an iterative algorithm that solves a known minimum cost flow problem.

Next, in step S7, the instruction unit 208 controls the communication unit 23 to transmit, to each moving object 4, control information for instructing the conveyance work of the cargo allocated to each moving object 4 in step S6. As a result, in each moving object 4, upon receipt of the control information by the communication unit 43, the controller 40 causes the moving object 4 to perform the conveyance work of the cargo indicated by the control information. For example, it is assumed that the conveyance work of the first cargo is allocated to the first moving object in step S6. In this case, in step S7, the instruction unit 208 transmits control information for instructing the first moving object to perform the conveyance work of the first cargo. As a result, in the first moving object, upon receipt of the control information by the communication unit 43, the controller 40 causes the moving object 4 to perform the conveyance work of the first cargo indicated by the control information.

In the embodiment and the modified embodiments described above, the mode has been described in which the controller 20 of the server 2 performs processing of generating and transmitting the control information instructing the conveyance work of the cargo. Alternatively, processing similar to the processing performed by the server 2 may be performed by a computer included in the charging device 5.

In this case, various information related to the conveyance control and the charge control stored in the storage 22 of the server 2 may be stored in advance in a storage device (not illustrated) included in the charging device 5. Alternatively, the computer of the charging device 5 may request the server 2 to transmit the various information, and the various information returned from the server 2 in response to the request may be stored in the storage device (not illustrated).

INDUSTRIAL APPLICABILITY

The present disclosure is useful for avoiding occurrence of an opportunity for a charging device to simultaneously charge a plurality of chargeable moving objects conveying a plurality of cargos in a warehouse, a factory, a harbor, and the like, the number of moving objects being more than or equal to the number of moving objects that are simultaneously chargeable.

The invention claimed is:

1. A control method of controlling a plurality of moving objects that convey a plurality of cargos, the control method comprising, by a computer:

acquiring a residual battery capacity of the plurality of moving objects;

determining a target residual battery capacity of the plurality of moving objects in a next unit of time;

allocating a conveyance unit to each of the plurality of moving objects based on the residual battery capacity and the target residual battery capacity of the plurality of moving objects and a weight of each of the plurality of cargos; and transmitting, to each of the plurality of moving objects, control information instructing a conveyance work of the conveyance unit allocated to each of the plurality of moving objects, wherein in the determining of the target residual battery capacity:

the target residual battery capacity is determined with a number of moving objects to be charged in the next unit of time being less than or equal to an upper limit number of moving objects that are simultaneously chargeable by a charging device;

the plurality of moving objects is divided into a plurality of groups having the upper limit number of moving objects or less;

a charging timing of moving objects in an arbitrary k-th group among the plurality of groups is set to be after k units of time; and the target residual battery capacity of the moving objects in the arbitrary k-th group in the next unit of time is determined with the residual battery capacity of the moving objects in the arbitrary k-th group after the k units of time being a predetermined charge start residual battery capacity.

2. The control method according to claim 1, wherein in the allocating of the conveyance unit to each of the plurality of moving objects, the residual battery capacity of each of the plurality of moving objects, when each of the plurality of moving objects performs the conveyance work of the conveyance unit, is calculated based on the residual battery capacity of each of the plurality of moving objects and the weight of each of the plurality of cargos, and the conveyance unit to be allocated to each of the plurality of moving objects is determined based on a difference between the residual battery capacity of each of the plurality of moving objects having been calculated and the target residual battery capacity of each of the plurality of moving objects.

3. The control method according to claim 2, wherein in the allocating of the conveyance unit to each of the plurality of moving objects, the conveyance unit is allocated to each of the plurality of moving objects with a sum of the difference in the plurality of moving objects being minimized.

4. The control method according to claim 2, wherein in the allocating of the conveyance unit to each of the plurality of moving objects, each of the plurality of cargos is regarded as one conveyance unit, a required time for each of the plurality of moving objects to perform the conveyance work of the conveyance unit is calculated based on a conveyance route of each of the plurality of cargos, and the conveyance unit is allocated to each of the plurality of moving objects with a sum of the difference in the plurality of moving objects being minimized and with a sum of the required time in each of the plurality of moving objects being less than or equal to a unit of time.

5. The control method according to claim 1, wherein in the determining of the target residual battery capacity, the target residual battery capacity of the plurality of moving objects in a p-th group is determined to be smaller than the target residual battery capacity of the plurality of moving objects in a q-th group to be charged after q units of time that are longer than p units of time.

6. The control method according to claim 5, wherein a difference between the target residual battery capacity of the plurality of moving objects in the p-th group and the target residual battery capacity of the plurality of moving objects in the q-th group is proportional to a difference between the p units of time and the q units of time.

7. The control method according to claim 1, wherein when the plurality of moving objects is divided into the plurality of groups, the plurality of moving objects is equally divided into the plurality of groups.

8. The control method according to claim 1, wherein when the plurality of moving objects is divided into the plurality of groups, a first group to be charged when a work amount of a conveyance of the plurality of cargos is a first work amount has more moving objects than a second group to be charged when the work amount is a second work amount that is larger than the first work amount.

9. The control method according to claim 1, wherein in the allocating of the conveyance unit to each of the plurality of moving objects, the plurality of cargos is equally divided into a same number of conveyance units as a number of the plurality of moving objects.

10. The control method according to claim 1, wherein the plurality of cargos includes a plurality of articles stored in a warehouse.

11. The control method according to claim 1, wherein the plurality of cargos includes a plurality of parts stored in a factory.

12. The control method according to claim 1, wherein the plurality of cargos includes a plurality of container cargos stored in a harbor.

13. A control device that controls a plurality of moving objects that convey a plurality of cargos, the control device comprising:

a processor; and a memory including a control program that, when executed by the processor, causes the processor to:

acquire a residual battery capacity of the plurality of moving objects;

determine a target residual battery capacity of the plurality of moving objects in a next unit of time;

allocate a conveyance unit to each of the plurality of moving objects based on the residual battery capacity and the target residual battery capacity of each of the plurality of moving objects and a weight of each of the plurality of cargos; and transmit, to each of the plurality of moving objects, control information instructing a conveyance work of the conveyance unit allocated to each of the plurality of moving objects, wherein when the processor determines the target residual battery capacity:

the target residual battery capacity is determined with a number of moving objects to be charged in the next unit of time being less than or equal to an upper limit number of moving objects that are simultaneously chargeable by a charging device;

the plurality of moving objects is divided into a plurality of groups having the upper limit number of moving objects or less;

a charging timing of moving objects in an arbitrary k-th group among the plurality of groups is set to be after k units of time; and the target residual battery capacity of the moving objects in the arbitrary k-th group in the next unit of time is determined with the residual battery capacity of the moving objects in the arbitrary k-th group after the k units of time being a predetermined charge start residual battery capacity.

14. A non-transitory computer readable storage medium storing a program that causes a computer of a control device, that controls a plurality of moving objects that conveys a plurality of cargos, to:

acquire a residual battery capacity of the plurality of moving objects;

determine a target residual battery capacity of the plurality of moving objects in a next unit of time;

allocate a conveyance unit to each of the plurality of moving objects based on the residual battery capacity and the target residual battery capacity of each of the plurality of moving objects and a weight of each of the plurality of cargos; and transmit, to each of the plurality of moving objects, control information instructing a conveyance work of the conveyance unit allocated to each of the plurality of moving objects, wherein when the computer determines the target residual battery capacity:

the target residual battery capacity is determined with a number of moving objects to be charged in the next unit of time being less than or equal to an upper limit number of moving objects that are simultaneously chargeable by a charging device;

the plurality of moving objects is divided into a plurality of groups having the upper limit number of moving objects or less;

a charging timing of moving objects in an arbitrary k-th group among the plurality of groups is set to be after k units of time; and the target residual battery capacity of the moving objects in the arbitrary k-th group in the next unit of time is determined with the residual battery capacity of the moving objects in the arbitrary k-th group after the k units of time being a predetermined charge start residual battery capacity.

15. The control method according to claim 1, wherein the determining determines the target residual battery capacity of each of the plurality of moving objects in the next unit of time.

16. The control method according to claim 1, wherein the target residual battery capacity is a target value of the residual battery capacity in the next unit of time.

* * * * *